United States Patent [19]

Race

[11] 4,054,917
[45] Oct. 18, 1977

[54] SYNTHETIC TERRAIN GENERATORS

[75] Inventor: John Philip Adrian Race, Burnham, England

[73] Assignee: Tector Limited, Slough, England

[21] Appl. No.: 480,266

[22] Filed: June 17, 1974

[30] Foreign Application Priority Data

June 15, 1973 United Kingdom ............ 28589/73

[51] Int. Cl.² ............................................ H04N 7/18
[52] U.S. Cl. .................................. 358/104; 35/10.2; 35/12 N
[58] Field of Search ............. 178/6.8, DIG. 35; 35/10.2, 12 N; 353/104; 340/27 MA; 235/150.2

[56] References Cited

U.S. PATENT DOCUMENTS

| 3,098,929 | 7/1963 | Kirchner | 235/150.2 |
| 3,605,083 | 9/1971 | Kramer | 178/6 |
| 3,833,759 | 9/1974 | Yatabe | 178/6.8 |
| 3,911,597 | 10/1975 | Milliard | 178/DIG. 35 |

Primary Examiner—Robert L. Griffin
Assistant Examiner—Edward L. Coles
Attorney, Agent, or Firm—Brisebois & Kruger

[57] ABSTRACT

A method and means for generating a synthetic terrain which is displayed on the screen of a cathode ray tube as a simulated landscape visible to an observer, and for use in conjunction with a vehicle simulator to provide a moving perspective view of a landscape.

The scanning beam of the cathode ray tube is modulated with a video signal which is representative of the visual characteristics of the landscape at a point which at any instant is defined by the intersection of the line of sight passing from the observer's eye through the instantaneous scanning point on the cathode ray tube screen with the plane of the simulated landscape.

17 Claims, 11 Drawing Figures

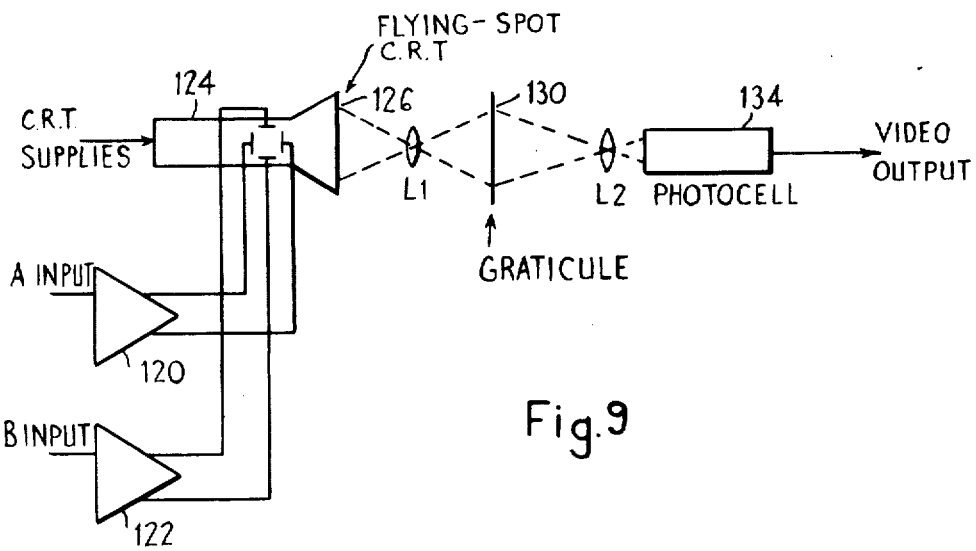
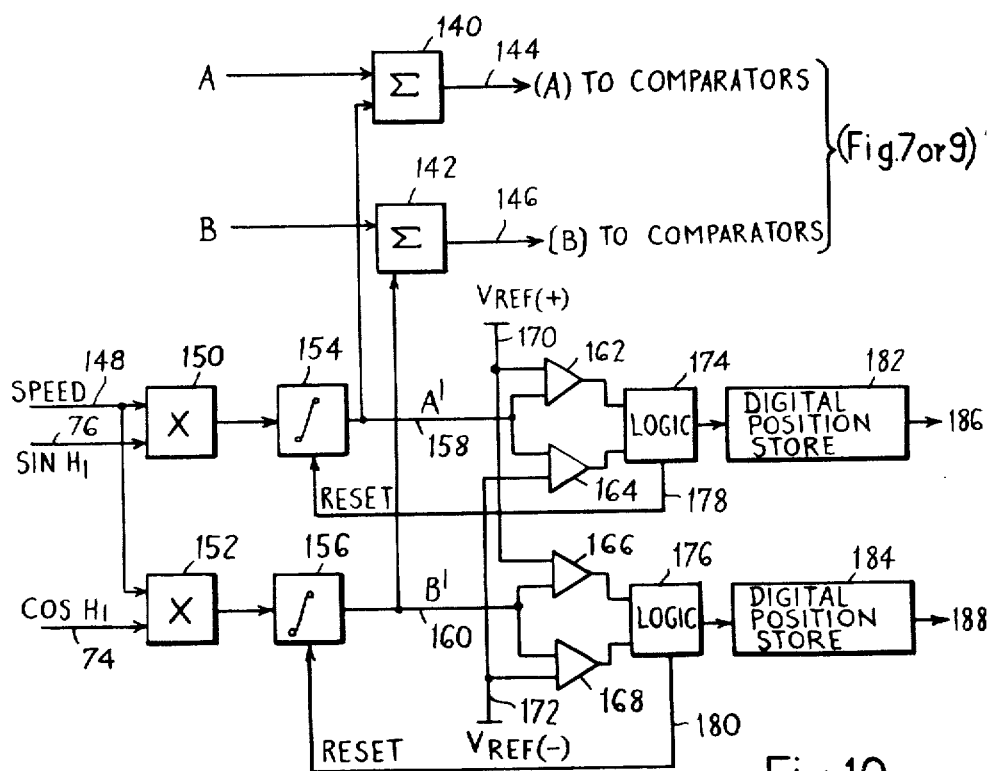

SYNTHETIC TERRAIN GENERATORS

The present invention relates to a synthetic terrain generator for use in conjunction with a vehicle simulator to provide a moving perspective view of a landscape. Such equipment is of particular use in the training of personnel involved in the piloting of aircraft, handling of marine craft and driving of land vehicles.

BACKGROUND OF THE INVENTION

In the field of vehicle simulation, there exists a requirement to provide a person using the simulator with a view of a landscape, in order to convey to him a number of important items of visual data. The most important amongst these are the vehicle's attitude its spatial relationship with certain defined objects of the landscape and its rate of movement with respect to these objects.

Many systems have been developed to generate such views, utilising mainly film systems, or television systems scanning a physical model. The former normally involves very complex optical methods for modifying the film image in response to changes in the simulator controls causing changes in the observer's position, whilst the latter normally utilises a television camera travelling over a miniature model landscape; the position of the camera being controlled by the simulator signals. Both these systems are complex and expensive.

SUMMARY OF THE INVENTION

The present invention provides a method and means for generating a perspective view of a terrain, with specific features, permitting up to six degrees of freedom of motion of an observer, i.e. of a vehicle controlled by the observer. These degrees of freedom are:

Ground position as two co-ordinates i.e. latitude and longitude,
Height above ground,
Direction of view i.e. heading in azimuth,
Pitch attitude relative to horizon,
Roll attitude relative to horizon, This freedom of motion makes the synthetic terrain generator of the present invention particularly suitable for use with aircraft simulators, without restricting it to use in this field.

The method used may employ a certain simplification in the trigonometric computation, to reduce the cost and the entire system can be produced very economically.

From one aspect the invention provides a method of generating a synthetic terrain which is displayed on the screen of a cathode ray tube as a simulated landscape visible to an observer, which method consists in modulating the scanning beam of a raster scanned cathode ray tube with a video signal which is representative of the visual characteristics of the landscape at a point which at any instant is defined by the intersection of the line of sight passing from the observer's eye through the instantaneous scanning point on the cathode ray tube screen with the plane of the simulated landscape.

From another aspect the invention provides a synthetic terrain generator for generating a video signal which can be displayed on the screen of a raster scanned cathode ray tube as a simulated landscape visible to an observer, comprising means for producing a video signal which is representative of the visual characteristics of the landscape at a point which at any instant is defined by the intersection of the line of sight passing from the observer's eye through the instantaneous scanning point on the cathode ray tube screen with the plane of the simulated landscape, and means for modulating the scanning beam of the cathode ray tube with said video signal.

BRIEF DESCRIPTION OF THE DRAWINGS

The invention will now be further described, by way of example, with reference to the accompanying drawings, in which:

FIG. 9 is a block diagram of a further embodiment of pattern generator.

FIG. 10 is a block diagram of a displacement signal generator; and

DESCRIPTION OF PREFERRED EMBODIMENTS

Figure 1:
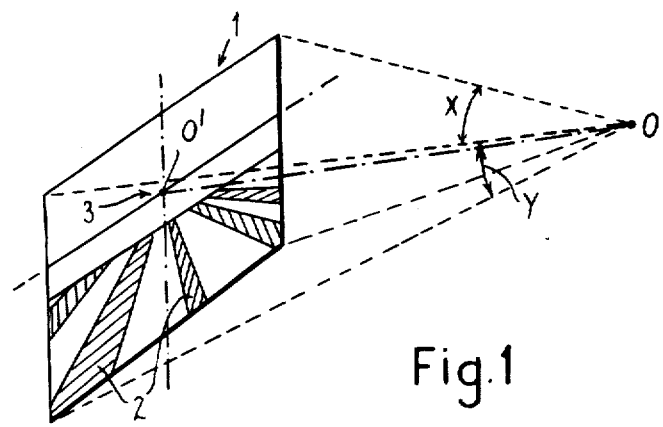
FIGS. 1 to 4 are explanatory diagrams illustrating the principles of the invention.

Referring to FIGS. 1 to 4, if as shown in FIG. 1, one considers a television monitor screen 1, at a distance D from an observer 0, who is positioned such that the line 0-0' is perpendicular to screen 1, then this screen can be considered as a window through which observer 0 looks at a landscape provided by a modulated video signal scanning the television screen. The angle of vision is restricted to angle X in the horizontal plane and to angle Y in the vertical plane. FIG. 1 also shows on the screen 1 a horizon line 3, and grid lines 2 representing one axis of the synthetic ground. If one considers point 0' as the reference point, and line 0-0' represents the line of sight of the observer 0 along the normal axis of the simulated vehicle, which is parallel with the ground, when the pitch angle of the vehicle is zero, the instantaneous position of the scanning spot defines another line of sight from the observer to a point in space, or on the synthetic ground.

Figure 2:
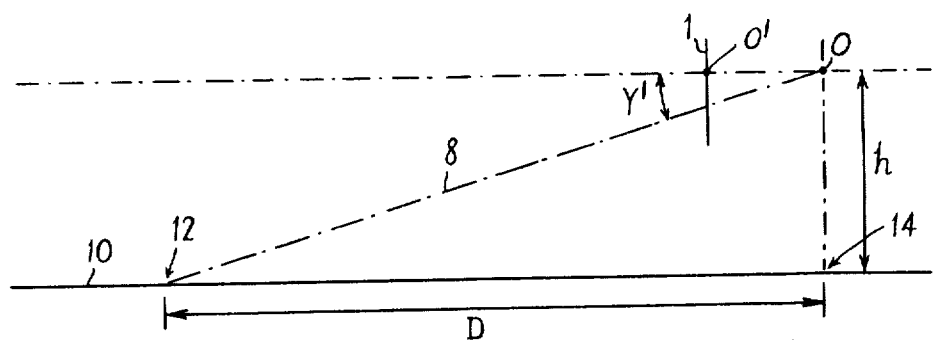
Figure 3:
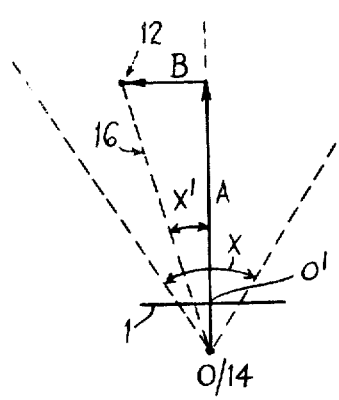

As shown in FIGS. 2 and 3, at any time, this line is characterised by angles Y' and X', being the angles of deviations from line 0-0'.

In FIG. 2, there is shown an observer 0, at a height $h$ above a ground plane 10. If the vehicle pitch angle is zero, then the reference line 0-0' is parallel with the ground. For a deviation Y' in the downward direction, one has a line of sight 8 which intersects the ground plane 10 at a point 12. The vertical projection of observer 0 onto this ground plane gives us intersection 14. The distance D between points 12 and 14 is given by:

$$D = h/\tan Y' \tag{1}$$

FIG. 3 represents a vertically downward view of the same situation, with the observer 0 (and projected position 14), a total angle of view X, centred on the line 0-0', an intersection of an instantaneous line of sight with the ground plane at 12, and line 16 having the length D as computed in equation (1).

For an angle X' one can now compute two vector values A and B as follows:

$$A = D \cos X' \quad (2)$$

$$B = D \sin X' \quad (3)$$

If the ground plane is now considered as composed of a rectangular grid Ao, $A_1$, ... An, Bo, $B_1$, ... Bn, with lines of width $w$ then one can construct FIG. 4, where the projected position 14 of the observer has moved by values A' and B' due to simulated vehicle motion, and the line of sight intersection 12 gives, as per equation (2) and (3), components A and B, such that one can state that the location of 12 is at $$Ao \pm (A' + A) \quad (4)$$

$$Bo \pm (B' + B) \quad (5)$$

If all the vectors and grid lines are represented by electrical values, then it is readily possible to interrogate the grid with the instantaneous potentials representing point 12, and whenever coincidence occurs, a signal is generated which, when utilised to modulate the cathode ray beam of the television monitor cathode ray tube, thus delineates on the monitor screen 1, a point of the grid representing the synthetic ground.

If the maximum value of vector A' and B' is restricted to one grid interval, by resetting these signals to zero whenever point 14 crosses a grid line, then the display effectively permits an infinite ground distance for motion, though only a finite area might be displayed. In this case, it is possible to keep a count of the number of reset operations effected, and this count then represents distance travelled from a reference origin. In the examples given so far, the line 0-0' has been considered as level in pitch and roll and directed parallel to the axis of the terrain grid.

In a practical system with full freedom, the direction of line 0-0' can change either by change of pitch of the vehicle, thus modifying angle Y', and/or a change of heading over a full 360°, thereby modifying angle X'. A further modification to be considered is a roll of the vehicle, causing the distance D to be continuously changing as the line of sight 8 moves from left to right during a single television scan line.

It is now possible to re-write the equations (1), (2) and (3) as:

$$D = h/\text{Tan}(Y' + P) \quad (6)$$

$$A = D \cos(X' + H_1) \quad (7)$$

$$B = D \sin(X' + H_1) \quad (8)$$

where $P$ is the vehicle pitch angle $H_1$ is the heading angle.

The modifications of Y' and X' necessary for roll is as follows:

$$Y_1' = X' \sin b + Y' \cos b \quad (9)$$

$$X_1' = X' \cos b - Y' \sin b \quad (10)$$

where $b$ is the roll angle.

In most vehicle simulators, the pitch angle, and to a lesser extent the roll angle, are fairly restricted, especially under normal training conditions. As the angles X and Y of the view through the television screens are also fairly restricted, it is possible in certain cases to simplify the equations, by accepting the slight error thereby introduced.

As such equation (6) can be re-written as:

$$D = h/Y' + P \text{ (simplifying pitch)} \quad (11)$$

and equations (7) and (8) become (simplifying azimuth):

$$A = D(\cos H_1 - X' \sin H_1) \quad (12)$$

$$B = D(X' \cos H_1 + \sin H_1) \quad (13)$$

whilst equations (9) and (10) become (simplifying roll):

$$Y_1' = X'b + Y' \quad (14)$$

$$X_1' = X' - Y'b \quad (15)$$

Combining equations (11) to (15), one obtains final equations for vectors A and B:

$$A = \frac{h(\cos H_1 - X' \sin H_1)}{X'b + Y' + P} \quad (16)$$

$$B = \frac{h(\sin H_1 + X' \cos H_1)}{X'b + Y' + P} \quad (17)$$

As a further elaboration, the maximum values of X', and Y', representing the edges of the television monitor screen, can be defined in terms of screen size and screen-observer distance, thus allowing the angle of vision to be adjusted such that it is correct for any chosen screen-observer distance.

The above simplification can be used where the angles P (pitch) and $b$ (roll) are small, but there also exist many instances where this is not the case. Where these angles are not restricted but X' and Y' are normally limited by the horizontal and vertical angles of view, the following equations can also be solved:

$$A = \frac{h(\cos H_1 - (X' \cos b - Y' \sin b) \sin H_1)}{\text{Tan}(X' \sin b + Y' \cos b + P)} \quad (18)$$

$$B = \frac{h(\sin H_1 + (X' \cos b - Y' \sin b) \cos H_1)}{\text{Tan}(X' \sin b + Y' \cos b + P)} - b), \quad (19)$$

These equations derive from equations (6), (9), (10), (12) and (13) above.

Several methods can be devised for computing equations (16), (17) or (18), and (19). The following embodiment to be described offers special advantages insofar as the only trigonometric computation needed at the television line scan rate is Tan Y'. This can be realised to a sufficient accuracy with a multi-segment non-linear network having the required bandwidth, e.g. a diode/resistor network.

Figure 5:
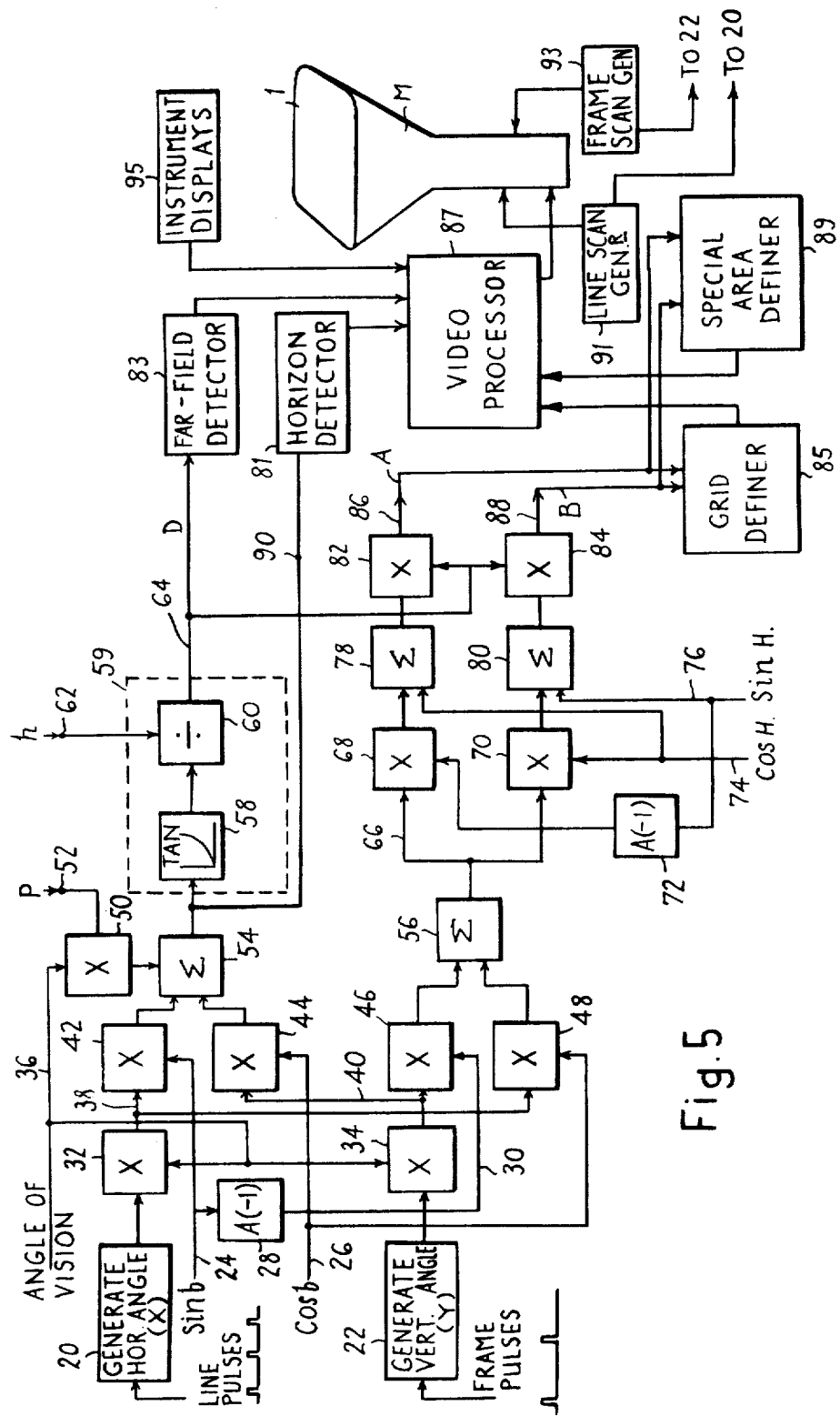
FIG. 5 is a block circuit diagram of one embodiment of synthetic terrain generator according to the invention.

One circuit arrangement for generating electrical signals representing equations (18) and (19) is shown in FIG. 5. Firstly, there are generated two electrical ramp signals to represent the horizontal and vertical angles of deviation. These signals are obtained in circuits 20 and 22, which are driven respectively by line and frame synchronising pulse trains obtained from any standard television synchronising-pulse generator, at any accepted scanning standard, e.g. the generators 91 and 93 as shown.

The output signals from 20 and 22 are preferably near the system reference or ground potential at a time corresponding to the vertical and horizontal axis passing through point 0' in FIG. 1.

These signals are then multiplied in circuits 32 and 34 with a signal 36 representing the angle of vision (dependent on the eye-screen distance) required in the system. The outputs at 38 and 40 represent X' and Y' of equations (7) and (8).

Multipliers 42, 44, 46, 48 inverting amplifier 28 and summing amplifiers 54 and 56 (ignoring the input from circuit 50) produce the transformation expressed in equations (9) and (10) as follows. The output of 42 is X' sin $b$ and is added to the output of 44 (Y' cos $b$); while the output from 46 ($-$Y' sin $b$) is added to the output from 48 (X' cos $b$), where sin $b$ and cos $b$ on lines 24 and 26 are obtained from the vehicle simulator. The pitch of the vehicle obtained from the vehicle simulator, (P on line 52) is multiplied in 50 with the angle of vision signal (line 36), and is then added to Y' in 54. The output of summing amplifier 54 drives the Tan function convertor 58 (when needed) and the resultant signal is applied to a divider 60, whose second input is height $h$ on line 62 again obtained from the vehicle simulator. The output 64 represents the distance D of equation (6) or (11).

The signal on line 66 is $X_1'$ of equation (10), and is combined in multipliers 68 and 70, inverting amplifier 72 and summing amplifiers 78 and 80 with the heading angle $H_1$ representing the mean heading angle of of the vehicle. This angle is applied as signals 74 and 76, representing the sin. and cos. values thereof. The outputs from summing amplifiers 78 and 80 represent the resolved angles $$[\cos H_1 - (X' \cos b - Y' \sin b) \sin H_1]$$

and $$[\sin H_1 - (X' \cos b - Y' \sin b) \cos H_1]$$

from equations (18) and (19).

These signals are applied to two more multipliers 82 and 84, having the distance D from line 64 as their second input. The outputs 86 and 88 are the signals A and B of equations (18) and (19).

Additional outputs appear on lines 64 and 90, to operate detectors 81 and 83 for the generation of the horizon signal and far-field suppression signal. The far field is defined as the region between a finite representation of the grid and the horizon.

The signals A and B are fed to a grid definer 85 whose output feeds a video processor 87 which is also fed with the outputs from the detectors 81 and 83. The video processor comprises gating and summing circuits operating according to techniques well known to those skilled in the art. The video signal from processor 87 modulates the cathode ray beam of the tube M of the television monitor producing the landscape on its screen 1. The cathode ray beam deflection is controlled by line and frame scan generators 91 and 93 according to any desired television scanning standard, e.g. 625 lines interlaced. Outputs from the line and frame scan generators also feed the circuits 20 and 22.

The video processor is also fed with signals from a special area definer 89 which is driven by signals A and B and, also if desired, with signals from instrument display circuit 95 which produces digital or other instrument presentations superimposed in fixed positions on the monitor screen 1.

The novel aspects of these circuits will be more fully described hereinafter.

Whilst the above is one preferred embodiment, certain alterations can be made if particular ranges of vehicle attitude are required.

An important instance relates to equation (6), where the error can be very severe when the observer looks vertically downwards, and a true vertical cannot be achieved; and hence D $\rightarrow$ O and Tan Y' $\rightarrow \infty$.

Figure 6:
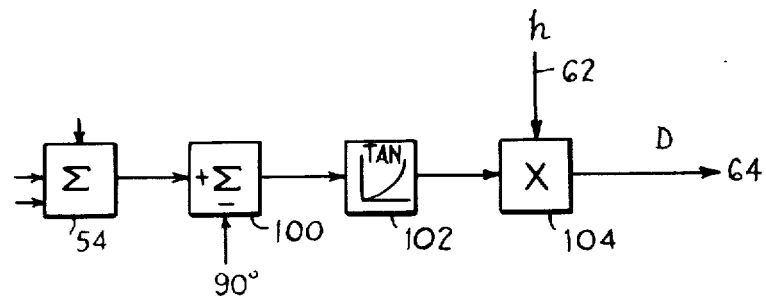
FIG. 6 is a block diagram of a modification to part of the circuit of FIG. 5.

At the expense of accuracy near the horizon, the equation can be modified as follows:

$$D = h \operatorname{Tan} [90° - (Y' + P)] \tag{20}$$

i.e. the complementary angle is used, and D cannot only reach zero, but can also reverse phase when (Y' + P) is greater than 90°. In such a case the part of FIG. 5 inside the dotted rectangle 59, consisting of circuits 58 and 60 is replaced with FIG. 6. Summing amplifier 59 is again shown, the output of which is (Y' + P). This is fed to subtractor 100, the output of which becomes 90° - (Y' + P). In practice, circuits 54 and 100 would be combined into a single stage. After processing in a tangent conversion stage 102, the multiplication takes place in 104 with $h$, fed on line 62, to give the distance signal D on line 64.

Figure 4:
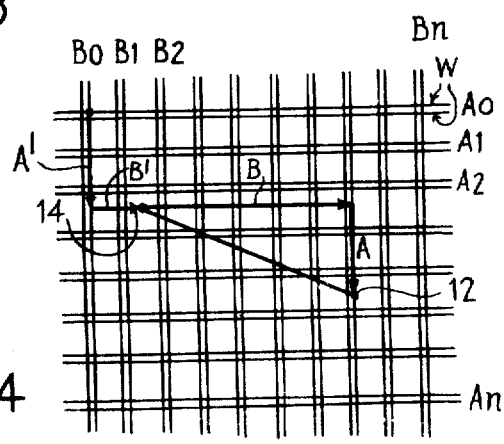

The signals A and B are vectors representing the co-ordinates of the intersection point of the line of sight with the ground, relative to the vertically projected observer position (see FIG. 4).

If these signals are now applied to a matrix of voltage level detectors, then the combined detector outputs would "paint" a grid structure on the screen 1 of the television monitor M scanned in synchronism with the system. As both A and B have positive and negative values, the matrix will normally be arranged in such a manner that the observer position (A = B = 0) is located near the centre of the grid.

Practical considerations prevent A and B reaching infinite values, necessary for generating a grid up to the horizon. Therefore preferentially the grid will have a finite size, and the area in the picture between the end of the grid and the horizon will normally be shown as a neutral far-field area appearing as if the visibility were such that detail is obliterated. The signal needed to obtain this effect is derived from a level detector operating on line 64 of FIG. 5. This detects when distance D is greater than a pre-set value, and at that time "paints" the neutral area. Another detector on line 90 of FIG. 5 generates an horizon signal which is used to define the horizon and brighten the area above the horizon line to represent sky.

Figure 7:
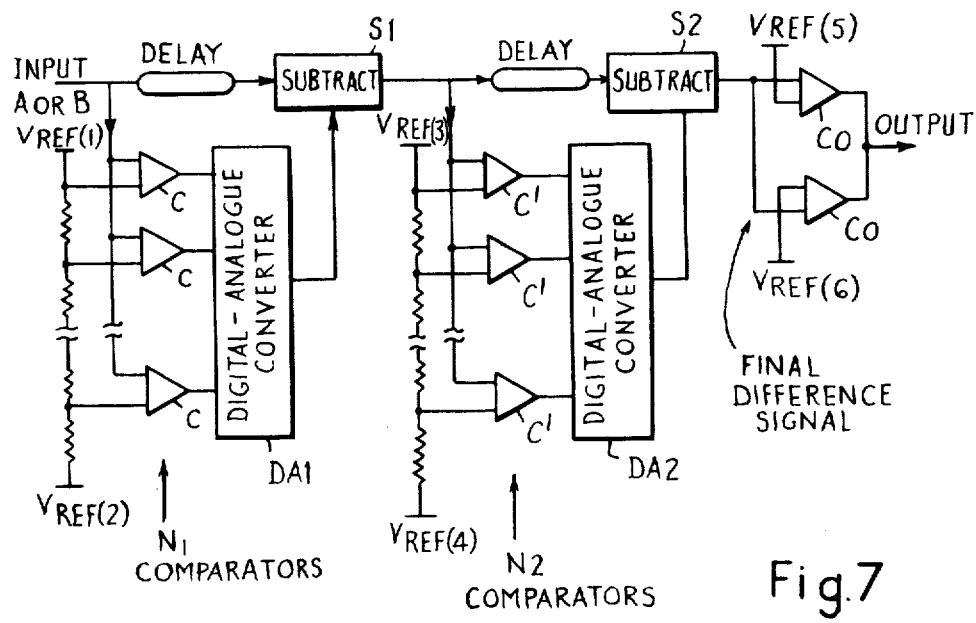
FIG. 7 is a block diagram of an embodiment of grid pattern generator.

The matrix for generating or defining the grid can consist of a large number of detectors, but this is very uneconomical, and several methods can be used to simplify this problem. The principle of the first method to be described is well known in the field of analogue-digital conversion and consists in converting the input signal into a digital code representing defined voltage levels. This digital signal is then subtracted from the input signal, thereby generating a difference signal which covers the area between digital levels (and thus equally-spaced lines of a grid). Suitable thresholding then generates the final image. Such a method is shown in FIG. 7, with associated waveforms in FIG. 8.

Those versed in the art will recognise a 2-stage parallel-serial converter, including digital-analogue converters, DA1 and DA2, and which divides the input voltage range A or B into ($N_1$ + 1) bands or levels, where $N_1$ and $N_2$ represent the number of comparators in each level. Typically, if both $N_1$ and $N_2$ are 7 then 64 input level bands are created, i.e. $(7 + 1) \times (7 + 1)$. The operation is as follows:

The first group of comparators C divides the input into $(N_1 + 1)$ bands and the output of the first subtractor S1 has a range representing one of these bands. This is applied to a second set of comparators C', which divide this band into $(N_2 + 1)$ bands, thereby producing at the output, via substractor S2, a signal representing $1/(N_1 + 1)(N_2 + 1)$ of the input signal. This is labelled the difference signal, and is applied to two further comparators $C_O$ with appropriate reference potentials. These define the line width w in FIG. 4.

Figure 8:
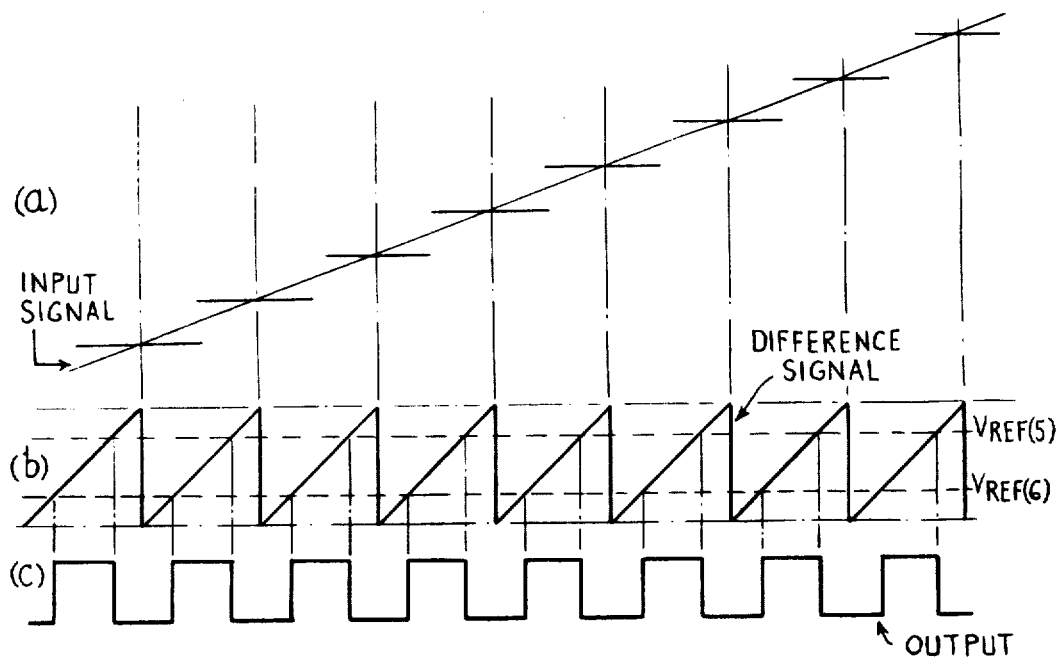
FIG. 8 illustrates waveforms relating to FIG. 7.

FIG. 8 shows at (a) part of the input signal, with conversion threshold levels; at (b) the resultant difference signal (not to same amplitude scale); and at (c) the comparator output which defines the grid pattern.

Any other analogue-digital converter which is capable of high conversion speed and accuracy can however be used to generate the difference signal, and thus drive the output comparators.

This conversion method is very economical, but has the drawback of only permitting totally regular patterns.

The following embodiment shown in FIG. 9 permits a greater freedom of shapes but is necessarily more complex. With reference to FIG. 9, the signals A and B are applied to amplifiers 120 and 122, which drive a very short persistence phosphor cathode ray tube 124. Although electrostatic deflection is shown, magnetic deflection may also be employed. As such the raster patterns on the tube face 126 relate to the vector signals A and B. This image is projected via lens $L_1$ onto a graticule 130 which represents, in terms of transmission or absorption, the desired grid or other similar pattern. The transmitted light is focussed via lens $L_2$ onto a photomultiplier 134, the output of which is the video signal. This arrangement is essentially a flying-spot scanner.

As the position of the scanning spot on the CRT face 126 is a measure of A and B, this position is imaged onto 130 and therefore the interrogation process occurs. Although not shown, means must be incorporated to modulate the beam current of the cathode ray tube 124 in order to achieve constant brightness, independent of scanning spot velocity.

In FIG. 4, and the explanations thereof, offset components A' and B' have been described as the means of obtaining apparent motion of the observer over the grid and the maximum value of A' and B' was stated to be one grid interval. In practice, this value can be greater, but must always be equal to a whole number of grid intervals. The displacement signals may be obtained from the simulator as X and Y position co-ordinates but these require modification to obtain the grid interval displacement signals A' and B'. However, FIG. 10 shows a preferred method for generating these displacement signals.

The vehicle linear speed over the ground, as computed by the vehicle simulator is applied on line 148, and feeds multipliers 150 and 152. The other input to each multiplier is respectively Sin $H_1$ and Cos $H_1$, thus producing speed vectors along the display grid axis. These signals are integrated in circuits 154 and 156, the output of which is a potential representative of the position of the vehicle. These outputs are added to signals A and B in summing amplifiers 140 and 142, to produce output signals on lines 144 and 146 which are used to drive the main comparator circuits (FIGS. 7 or 9). These signals A' and B' on lines 158 and 160 also drive comparators 162, 164, 166, 168, operating against a positive and a negative reference potential. These potentials are such that the potential change from integrator reset level to either reference potential equals one or more whole grid-interval potential differences at the input to the main comparators (on lines 144 and 146). When the potential on lines 158 or 160 reaches and exceeds the reference potential, the appropriate comparator (from group 162, 164, 166, 168) switches, and via the logic control blocks 174 and 176 resets the particular integrator via lines 178 and 180, and simultaneously feeds a count pulse into the digital store 182 or 184. The data in these stores can be used by further network such as the special area definer 89 (FIG. 5), as an origin reference, indicating displacement from the original starting point. The outputs are derived at 186 and 188. The logic circuits are simple and can be readily produced by anyone versed in standard digital techniques.

Figure 11:
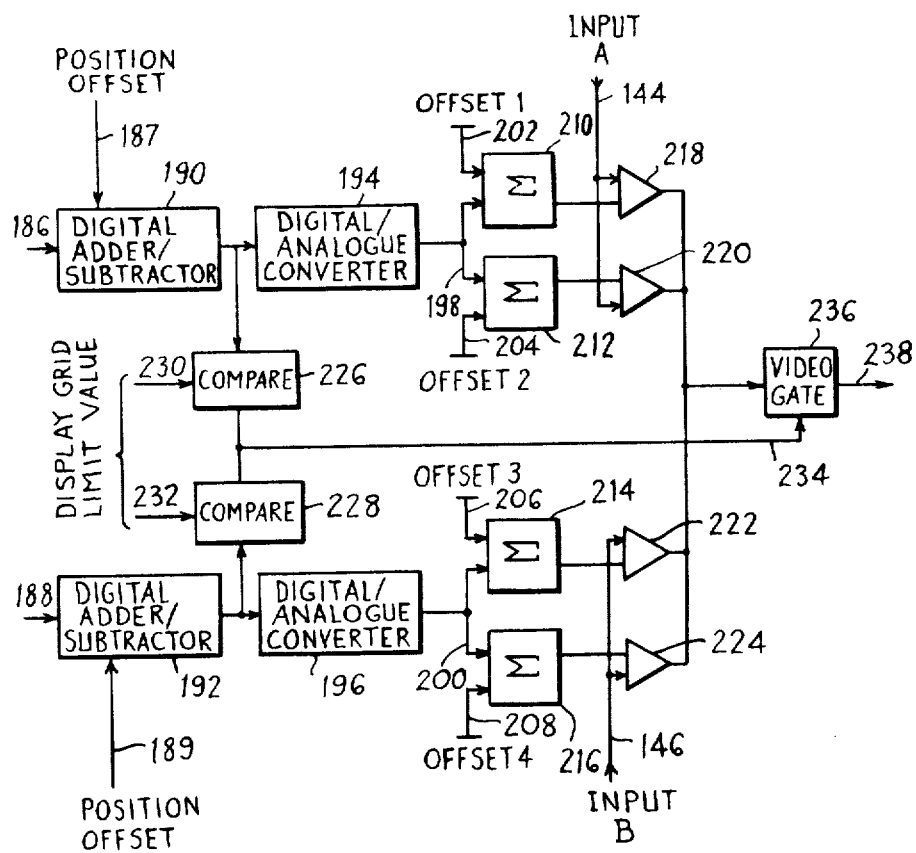
FIG. 11 is a block diagram of a generator of signals defining a special area of the grid pattern of FIG. 7.

The invention also provides a method and means of marking or delineating one or more defined areas on the displayed grid as special areas, e.g. as runways. One preferred method is shown in FIG. 11. The position stores 182 and 184 (see FIG. 10) hold data on the position of the observer relative to an origin datum point. The outputs from these stores on lines 186 and 188 are connected to digital adder/subtractor units 190 and 192, which have second inputs 187 and 189. The signals on these two lines are the offset between the origin datum and the position of the area to be displayed. The outputs of 190 and 192 thus define a new datum point, and will be zero when the observer is over this point in the display grid. These outputs drive the digital/analogue converters 194 and 196, whose outputs 198 and 200 are fed via four summing amplifiers 210, 212, 214, 216 to four comparators 218, 220, 222, 224.

Relative to inputs A and B on lines 144 and 146, the potentials on 198 and 200 define a particular datum point for the special area and the offset potentials on 202, 204, 206 and 208 define the position of the four edges of this area with respect to the datum point. Thus a long rectangle (such as a runway) can be easily defined. Comparators 218 and 220 form a "window" on signal A, and comparators 222 and 224 form a "window" on signal B. As signals A and B represent positions on the display grid, these "windows" define an area on the grid, and this area has a defined position with respect to the origin. As the displayed grid has only a finite size, but the system permits a deviation from origin which is much greater, it is necessary to include a video gate 236 in the output line, to prevent spurious displays outside the grid area. The suppression signal 234 is generated in comparator networks 226 and 228, which are driven by signals representing the maximum displayed grid area, (on lines 230 and 232), and the outputs from 190 and 192. The video output signal on line 238 is mixed with the video signal from the main comparators (see FIGS. 7 and 9), using normal video processing methods as used in television image processing.

Although the main techniques of this invention have been described as analogue computations, because of the speed requirement, it is equally possible to realise the entire system as a digital system.

The following further features may also be included in the system:

Wide angle vision. The field of view available to the observer may be extended by the following techniques:

Lens or mirror systems, coupled with television projection monitors.

Additional display generators driving further monitors, each representing another window to the right, left, above or below the central forward-view window: e.g. for helicopters. In the case of side-view, roll and pitch inputs are interchanged, and 90° is added or subtracted to the vehicle's heading.

Colour presentation can also be simply achieved by modifying the video processor so as to include colour information circuits as well as gating and summing circuits.

Low visibility and cloud are easily simulated by modulating contrast at appropriate distances from the observer, and (in the case of cloud) at an appropriate observer height.

I claim:

1. A method of generating a synthetic terrain which is displayed on the screen of a cathode ray tube as a simulated landscape visible to an observer, which method includes modulating the scanning beam of a rectilinear raster scanned cathode ray tube with a video signal which is representative of the visual characteristics of the landscape at a point which at any instant is defined by the intersection of the line of sight passing from the observer's eye through the instantaneous scanning point on the cathode ray tube screen with the plane of the simulated landscape, said rectilinear raster appearing to said observer as a simulated window through which he views the landscape, said method further comprising:

generating first electrical signals representative of the instantaneous horizontal deviation angle and instantaneous vertical deviation angle of the line of sight from a predetermined reference line from the observer's eye generally parallel to and above the simulated landscape, said signals representing pure angles, and being of different frequency and being generated from ramp signals derived from the vertical and horizontal scanning signals producing said rectilinear raster, generating from said vertical deviation angle signal a distance signal representative of the distance between a point on the simulated landscape defined by the vertical projection of the observer onto said simulated landscape and the intersection of the observer's line of sight with said simulated landscape, generating further electrical signals from said first electrical signals and said distance signal, said further signals being representative of vectors defining said intersection of the observer's line of sight with the simulated landscape, in a two coordinate system, generating signals defining features on said terrain, detecting coincidence in amplitude between the signals representing said intersection and said features, and modulating the scanning beam of said cathode ray tube with video signals indicative of said coincidence.

2. A method as claimed in claim 1, in which the video signal is such as to enable the simulation of six degrees of freedom of motion of the observer, namely ground position as two co-ordinates, height above ground, azimuth direction of view or heading, pitch angle relative to horizon and roll angle relative to horizon.

3. A method as claimed in claim 2, wherein signals representative of some of said six degrees of freedom are derived from a simulator representing the operation of a vehicle under the control of the observer.

4. A method as claimed in claim 1, which includes the step of generating displacement signals representative of simulated movement of the observer relative to the landscape and combining said displacement signals with said further electrical signals and/or said first electrical signals.

5. A method as claimed in claim 4, which includes the steps of generating said synthetic terrain signals as one section of a grid pattern and resetting said displacement signals to zero each time said signals cross a grid line thereby obtaining an infinite distance for motion over said terrain.

6. A method as claimed in claim 1, including the steps of generating a signal to represent a specially defined area on said landscape and combining said signal with the synthetic terrain signals.

7. A method as claimed in claim 1, which includes the step of producing a video signal representative of a horizon to said simulated landscape and of sky above said horizon.

8. A method as claimed in claim 1, which incudes the step of producing a far-field signal representative of a region of indefinite detail between the detail defined landscape and said horizon.

9. A synthetic terrain generator for generating a video signal which can be displayed on the screen of a rectilinear raster scanned cathode ray tube as a simulated landscape visible to an observer, said generator comprising circuit means for producing a video signal which is representative of the visual characteristics of the landscape at a point which at any instant is defined by the intersection of the line of sight passing from the observer's eye through the instantaneous scanning point on the cathode ray tube screen with the plane of the simulated landscape, said rectilinear raster appearing to said observer as s simulated window through which he views said landscape, said circuit means comprising:

means for generating first electrical signals representative of the instantaneous deviation angles, in two planes of a coordinate system, of said line of sight from and with respect to a reference line from the observer's eye generally parallel to and above the simulated landscape, said signals representing pure angles and being of different frequency and being generated from ramp signals derived from the vertical and horizontal scanning signals producing said rectilinear raster, means for generating from said deviation angle signals, and a height above the simulated landscape of the observer's eye signal electrical signals representative of component vectors in one plane to define the intersection of said line of sight with said simulated landscape, means to generate signals defining features on said terrain, means to detect coincidence in amplitude between the signals representing said intersection and said features, and means to modulate the scanning beam of said cathode ray tube with video signals indicative of said coincidence.

10. A generator as claimed in claim 9, which includes means for generating displacement signals representative of simulated movement of the observer relative to the simulated landscape and means for combining said displacement signals with said vector signals and/or said simulated landscape signals.

11. A generator as claimed in claim 10, including means for generating said simulated landscape signals as one section of a grid pattern and means for resetting said displacement signals to zero each time said signals cross a grid line, thereby obtaining an infinite distance for motion over said simulated landscape.

12. A generator as claimed in claim 9, including means for generating a signal to represent a specially defined area on said landscape and means for combining said signal with said simulated landscape signals.

13. A generator as claimed in claim 9, including means for generating a video signal representative of a horizon to said simulated landscape and of sky above said horizon.

14. A generator as claimed in claim 9, including means for generating a far-field signal representative of a region of indefinite detail between the detail defined landscape and said horizon.

15. A generator as claimed in claim 9 wherein said simulated landscape signals are generated by a circuit comprising analogue/digital conversion means and comparators.

16. A generator as claimed in claim 9 wherein said simulated landscape signals are generated by a flying spot scanner arrangement in combination with a transparency representing features of the desired terrain.

17. A generator as claimed in claim 9, including means for feeding said generator with data signals from a vehicle simulator.

* * * * *